Sept. 13, 1960 L. T. OREBAUGH 2,952,111
DUMP RAKE
Filed Dec. 23, 1957 4 Sheets-Sheet 3

INVENTOR
Leonard T. Orebaugh
BY Mason, Fenwick & Lawrence
ATTORNEYS

Sept. 13, 1960 L. T. OREBAUGH 2,952,111
DUMP RAKE
Filed Dec. 23, 1957 4 Sheets-Sheet 4
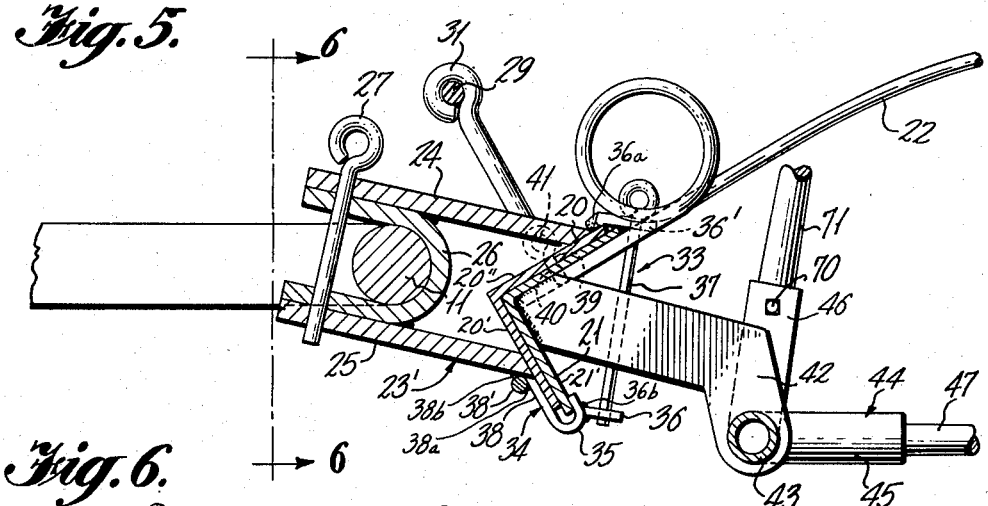
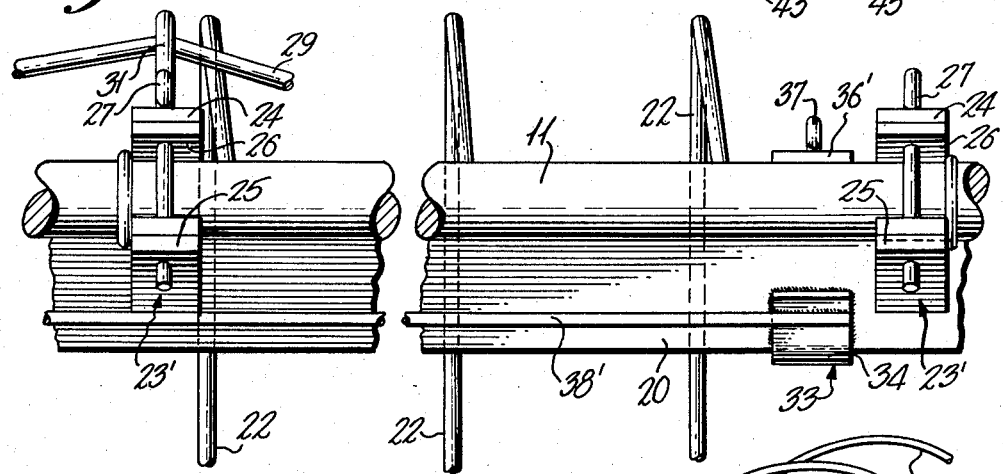
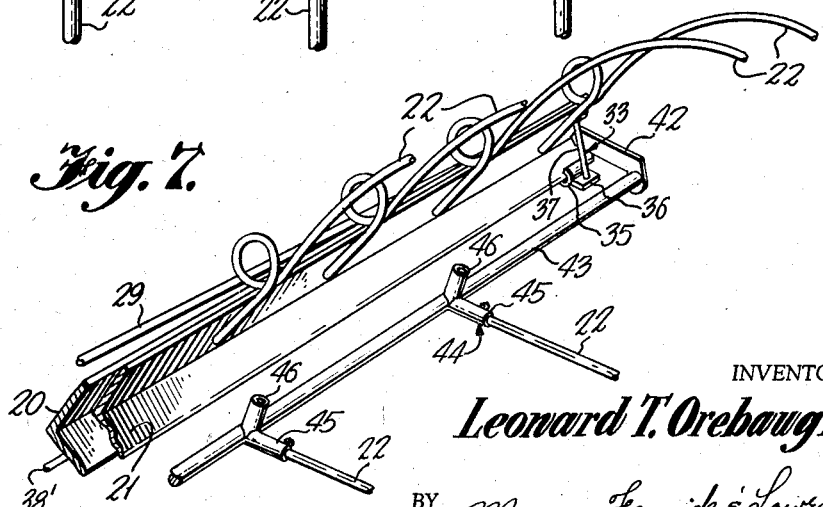
INVENTOR
Leonard T. Orebaugh
BY Mason, Fenwick & Lawrence
ATTORNEYS

United States Patent Office 2,952,111
Patented Sept. 13, 1960

2,952,111

DUMP RAKE

Leonard T. Orebaugh, Timberville, Va., assignor of one-third to Lester D. Hoover and one-third to Vernon S. Orebaugh, both of Timberville, Va.

Filed Dec. 23, 1957, Ser. No. 704,508

4 Claims. (Cl. 56—27)

This invention relates to tractor mounted dump rakes and to such rakes for use in orchards.

Tractor mounted dump rakes are well known. Such rakes have tines mounted on rake heads and cooperating cleaner rods independently mounted and spaced between the tines. When the tines of the rake have collected a sufficient amount of the material being raked, the tines are lifted out of the material with the stripper rods holding the material against upward movement of the tines. The lifting of the tines is usually powered by the tractor through gear or chain driven mechanism having separate controls or by linkage which requires extensive modification of the tractor.

Tractor mounted dump rakes have not been generally adapted for use in orchard raking, since the height of the tractor does not permit it to pass under the boughs of the orchard trees. Such side rakes as are known are not suitable for raking orchards because of the variables of the planting plan for various types of fruit and nuts and the bough spread of the trees.

The type of tractor with which the present invention is to be associated is the well known farm tractor having a conventional power operated vertically swingable drawbar. Such tractors have a large transmission housing, framing, wheel guards and other sturdy superstructure. The present invention is an attachment to be detachably mounted or supported on the drawbar.

Consequently, it is an object of the present invention to provide a tractor mounted rake which may be easily attached to any tractor having a mechanically or hydraulically liftable draw bar with the only modification of the tractor required being the addition of a pair of brackets.

Another object of the invention is to provide a fast dumping action for the rake, so that the windrows will be compact and the travel of the tractor uninterrupted during dumping.

Still another object of the invention is to provide the rake with a head which extends far to one side of the tractor so that the tractor may travel in the open space between the trees and rake the brush under the boughs of one side of the trees, from the outer perimeter of the bough spread to the trunks of the trees.

A further object of the invention is to provide the rake with an extendable rake head to make it adaptable to various types of trees and planting plans.

A still further object of the present invention is to provide the extendable head, tractor-mounted, fast dumping rake with a dumping action operable solely by means of the lever with which the tractor is equipped for lifting and lowering the drawbar.

Other objects of the present invention will become apparent to those skilled in the art from a reading of the following description in conjunction with the drawing, wherein:

Figure 5 is an enlarged transverse vertical sectional view taken on the line 5—5 of Figure 2;

Figure 6 is a partial front elevational view taken on the line 6—6 of Figure 5; and Figure 7 is a perspective view of a portion of the outrigger rake head.

Figure 1:
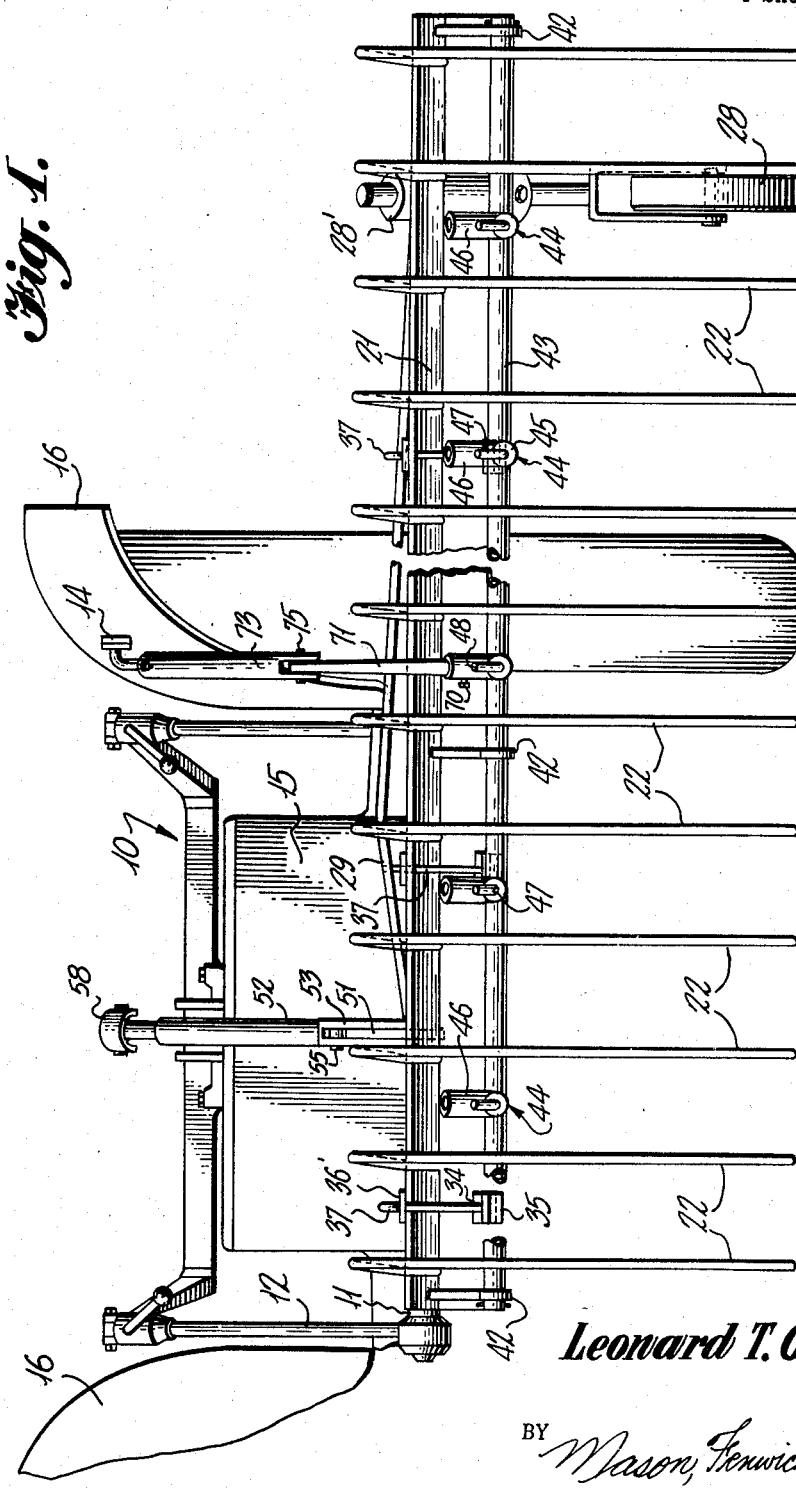
Figure 1 is a fragmentary rear elevation of the rake of the present invention mounted on the drawbar lift of a tractor.
Figure 2:
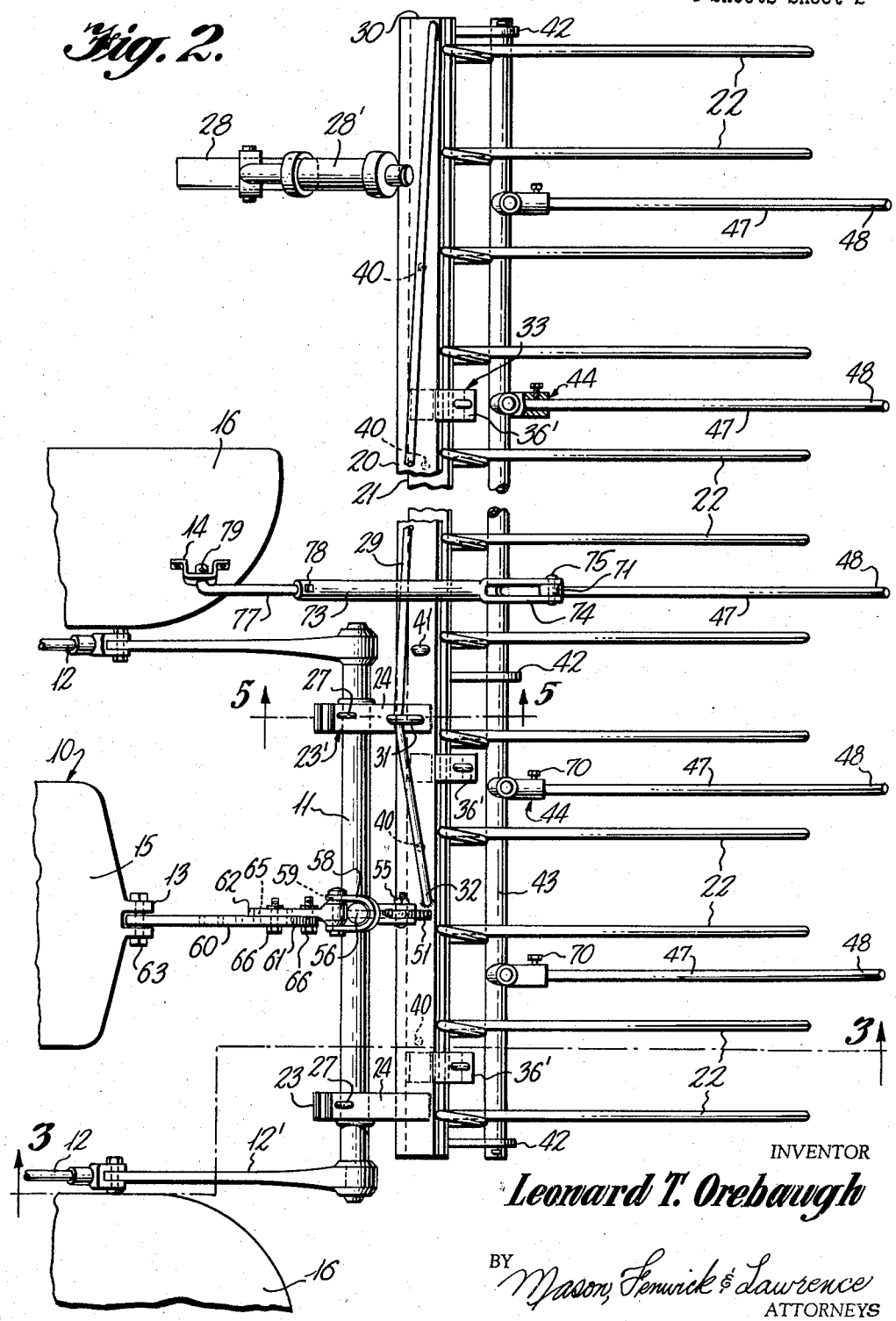
Figure 2 is a fragmentary plan view of the rake shown in Figure 1.
Figure 3:
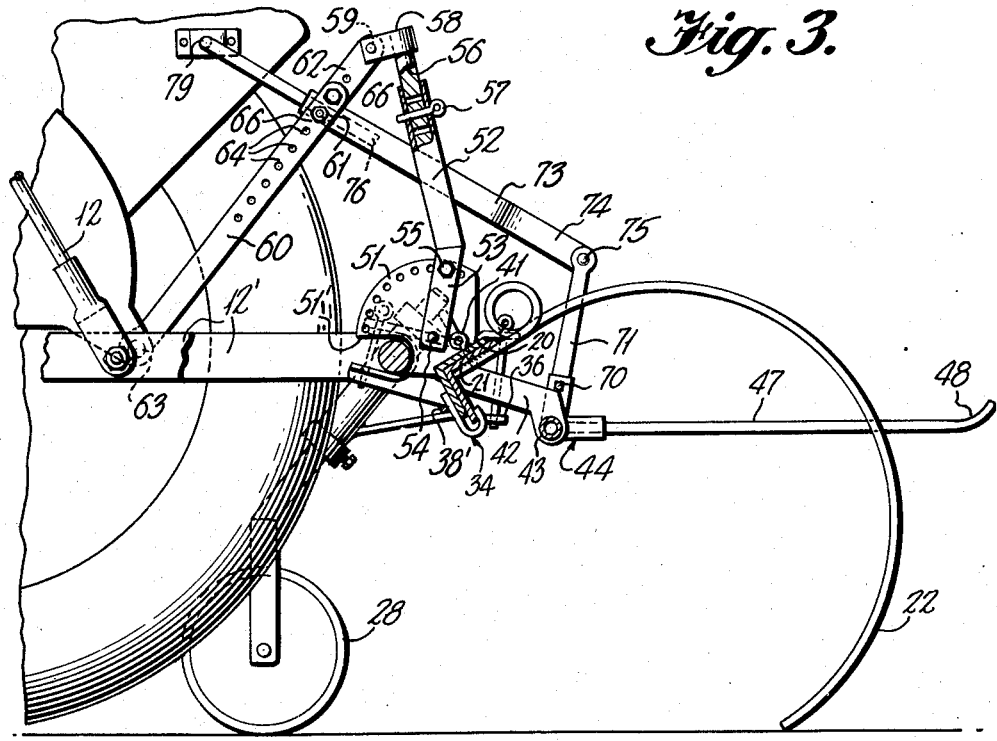
Figure 3 is a vertical sectional view taken on the line 3—3 of Figure 2 with other parts broken away and shown in section.
Figure 4:
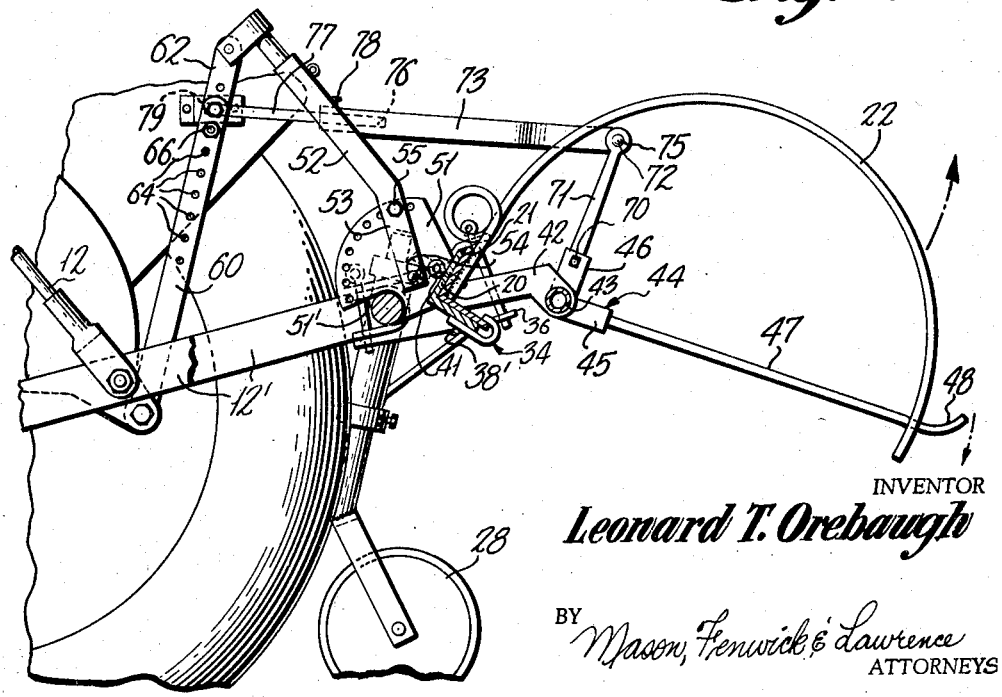
Figure 4 is a view similar to Figure 3, but showing the tines partially elevated and the stripper partially lowered.

Adverting now to the drawings, and particularly to Figures 1 and 2, there is shown a conventional tractor 10 having the usual drawbar 11, which is hydraulically elevated and lowered through linkage 12, 12'. A pair of brackets 13 and 14 fixedly attached to the differential housing 15 and the wheel guard 16, respectively, are the only modifications to be made in a tractor having an elevatable drawbar. In some instances only bracket 14 is required as many tractors have a bracket 13 as standard equipment. The purpose of the brackets 13 and 14 will be later described.

The rake head of the present invention comprises a pair of transversely extending superposed angle members 20 and 21, with the innermost or rearwardly positioned angle member 21 having curved spring tines or fingers 22 fixed thereon in any suitable manner. The outermost or forward angle member 20 is provided with a pair of spaced apart drawbar mounting brackets 23, 23' for attaching the member 20 to the tractor drawbar. As shown in Figure 5, each of the brackets 23, 23' comprises upper and lower spacing members 24 and 25 to receive a U-shaped member 26 attached by a suitable means such as welding within the spaced members 24 and 25 having the parallel legs of the U-shaped member 26 parallel with the parallel spaced members 24, 25 and with the open end of the U-member 26 positioned toward the tractor to receive the drawbar 11. The members 24, 25 and 26 are apertured to receive the retaining pins 27 for pivotally attaching the rake head to the drawbar. The superposed angle members 20 and 21 extend across the drawbar of the tractor and outwardly a considerable distance on one side of the tractor. The distance which the fixed member 20 extends from the side of the tractor is the distance from the tractor when driven down the middle of the space between the rows of trees to the trunks of the trees of an average orchard. To relieve the drawbar connections of excess strain an outrigger, or swivel type wheel 28 is mounted by bracket 28' near the outer end of the angle member 20. To further reinforce the angle member 20, one end of a truss rod 29 is attached as by welding to the outer end 30 of the angle member 20 and is passed through an upstanding apertured stud 31 and the other end is welded at a point spaced from the stud 30 as at 32.

The angle member 21 is held in nested relation with and longitudinally slidable in the angle member 20, by means of a plurality of keepers, or fasteners, 33. The fasteners 33 comprise the hanger 34 which is a hook-shaped piece of metal having a U-bend 35 at its outer end, apertured keeper studs 36, 36' and keeper pin 37. The shank 38 of the hanger is attached as by the weld 38a to the lower flange 20' of the angle member 20, and the lower flange 21' of the angle member 21 is received in the hook portion. To reinforce the weld 38a, a rod 38' is welded as at 38b adjacent the juncture of the spacing members 25 and the shank 38 of the hangers.

The keeper stud 36' is attached, as by welding 36a to the upper flange 20" of the angle member 20 and extends outwardly beyond the edge of the angle member 21. Likewise, the keeper stud 36 is attached as by welding 36b is to the hook 35 near its end and the studs 36, 36' are apertured to receive the keeper pin 37. The plurality of spaced fasteners 33 form a track on which the angle member 21 may be moved relative to the member 20 longitudinally thereof, and holds the members 20 and 21 in superposed relation. In order to slide the member 20 in its brackets 35, it is of course, necessary to remove all of the keeper pins 37 and tilt the angle member 21 away from the angle member 20, so that the tines 22 will clear the studs 36'.

Since the side-extended length of the member 20 may be adapted for an orchard of trees having an average or small bough spread adjacent the aisle in which the tractor travels, such trees being planted closer together than in orchards of trees having a larger bough spread, the longitudinally slidable angle member 21 on which the tines 22 are mounted may be slidably extended to rake beneath trees having a much greater bough spread, enabling the tractor operator to drive down the aisle between the rows of trees with the rake head extended to the trunks of the trees.

The angle member 20 is apertured as at 39, and the angle member 21 has spaced apertures 40, any of which may be aligned with the aperture in the angle member 20 by sliding the angle member 21 along its track to extend it the selected distance for raking an orchard. The angle member 21 is held in its normal or extended position by inserting a pin 41 through one of the apertures 40 and the aperture 39.

In addition to the tines 22, the angle member 21 is provided with a plurality of brackets 42. A shaft 43 is journaled in the brackets 42. A plurality of socket members 44 having socket arms 45 and 46 are fixedly mounted on the shaft 43 at spaced intervals along the length of the shaft. In the example used for illustrating the invention, the sockets 44 are spaced on the shaft 43 intermediate each pair of tines 22 and the angle between the socket arms 45 and 46 is slightly less than a right angle.

A stripper rod 47 is fixedly mounted in each of the socket arms 45. The purpose of the stripper rods 47 is two-fold: To remove the collected brush from the tines; and to form a compact windrow. The dumping action of the present rake, which is soon to be described, includes not only lifting the rake head away from the collected material and rotating the tines upwardly while the material is held by the stripper rods, but also in rotating the stripper rods downward until they nearly touch the ground, thereby compacting the windrow by the forward movement of the tractor. The stripper rods 47 have upturned ends 48. The ends 48 lie parallel with the ground when they are adjacent the ground during dumping.

As stated, the dumping action of the rake is effected by simply moving the hydraulic drawbar lift of the tractor to an elevated position. To rotate the tines upwardly for dumping, the rake head is rotated about its pivoted connection of the drawbar in the brackets 23, 23'. A sector plate 51 is fixedly mounted on the angle member 20 midway between the mounting brackets 23, 23'. The sector plate 51 has a pivot slot 51' which partially embraces the drawbar 11 and relieves the brackets 23, 23' of strain when the rake head is rotated. A tubular lever 52 which may be bent as shown has a bifurcated end 53 to straddle the sector plate 51. The end 53 is pivotally attached to the sector plate 51 by means of a bolt 54 and adjustably held in fixed position by means of a pin and hole fastening means 55. An extension rod 56 is telescopically mounted in the tubular lever 52 and adjustably attached therein by means of a pin and hole fastening means 57. A U-shaped bracket 58 is welded at its U-bend to the outer end of the rod 56. The open, extending legs of the bracket 58 are provided with aligned holes 59. A coupling lever or link 60, having an end 61 to receive an extension 62 in lapped relation, is journaled at one end in the bracket 13 on the differential housing of the tractor by a bolt 63 and the other end is rigidly but adjustably connected to the extension 62 by means of a series of holes 64 in the end 61 of the link 60, which align with the series of holes 65 in the extension and are held in adjusted position by a pair of bolts 66.

When the tractor drawbar is lifted, the rake head is revolved about its pivot on the drawbar by the lever 52 held by the link 60 to revolve the rake head and tines upwardly away from the collected material.

The adjustable fastening of the lever 52 to the sector plate and to the extension rod 56, as well as the adjustable fastening of the link to its extension 62 are to provide for any adjustment that may be necessary to adapt the rake to fit various makes of tractors.

The deflection of the stripper rods 47 to the ground when the rake is dumped is accomplished by leverage somewhat similar to that used for rotating the tines but, of course, operates to rotate the stripper rods in a direction opposite to that in which the tines rotate.

Each of the sockets 46 is provided with a set screw 70. An arm or lever 71 of circular cross-section is inserted in one of the sockets 46 and the set screw 70 of the selected socket 46 is tightened to fasten one end of the arm 71 in said socket. The selection of the socket 46 is determined by the amount of extension, if any, of the angle member 21 beyond the outer end of the angle member 20. The other end of the arm 71 is flattened and provided with a bearing 72. A coupling lever 73 of circular cross-section has one end slotted as at 74. The end of the arm 71 is mounted in the slot and pivotally connected to the link by means of a bolt 75 inserted through aligned apertures in the slotted end of the lever and the bearing 72. The other end of the lever 73 is bored to form a socket 76 to receive one end of a rod 77. The extension rod 77 is held in the socket in an adjusted position by a set screw 78. The other end 79 of the rod 77 is pivotally journaled in the bracket 14 on the wheel guard of the tractor. The attachment of the lever 73 to its extension rod 77 is made adjustable to meet the design differences of the various makes of tractors.

The arm 71 and the link 73 pivotally joined together by the bolt 75 form a toggle and the legs of the toggle are angularly positioned so that when the drawbar is raised the arc described by the pivot point for the stripper rods, namely, shaft 43, diverges from the arc described by the pivot point of the toggle. With respect to the linkage for operating the rake head and rake tines, the arm 52 and link 60 form a toggle connected at 59 and they are angularly positioned so that the arc described by the pivot point 59, when the drawbar is raised, will converge toward the arc described by the pivot point of the rake head, namely drawbar 11.

The apertures 40 are so positioned that one of said apertures will align with the aperture 39 to receive the pin 41 when the socket 46 is in longitudinal alignment with the lever 73 so that the arm 71 may be fastened in one of the sockets 46 selected for positioning the angle member 20 with respect to the angle member 21. To change the adjustment of the angle member 21 with respect to the angle member 20, as when the dump rake is changed from one orchard to another having a different variety of trees, it is only necessary to remove the pin 41, the keeper pins 37 and arm 71 from socket 46 and slide the angle member 21 relative to the angle member 20 until the desired amount of extension of the angle member 21 is obtained with the aperture 39 in alignment with one of the apertures 40. The pin 41 is then inserted in the apertures 39 and 40, the keeper pins 37 are re-inserted in the keeper studs 36 and arm 71 is fastened in the socket 46 which has come into alignment to receive it.

While there has been disclosed in the foregoing description a practical embodiment of a fast acting dump rake for raking orchards, it will be understood by those skilled in the art that variations in the implementation of the concept of the invention are within the purview and scope of the invention.

What is claimed is:

1. A dump rake attachment for detachably mounting on the vertically swingable power-operated drawbar of a farm tractor having rigid body members such as a transmission housing, wheel guards and the like to rake material and dump it in windrows comprising, a pair of elongated rake head members having releasable intercoupling means holding them in longitudinal adjacency, longitudinally spaced mounting brackets attached to one of said elongated rake head members to mount said rake head member transversely of said tractor, said mounting brackets having releasable journaling means to pivotally receive said drawbar of said tractor, a lever fixedly mounted on said first mentioned rake head member, a second lever having one end pivotally connected to said first lever, said second lever having its other end pivotally connected to one of said rigid body members, a plurality of spaced raking tines mounted on said other elongated rake head member and extending outward therefrom, at least a pair of supporting brackets extending outward from said second mentioned rake head member, a stripper rod shaft pivotally journaled in said supporting brackets, stripper rod sockets fixedly mounted on said shaft and spaced intermediate said raking tines, a stripper rod mounted in each of said stripper rod sockets, a plurality of spaced socket-containing members fixedly mounted on said shaft, a third lever having one end mountable in one of said spaced socket-containing members, a fourth lever having one end pivotally connected to the other end of said third lever and having its other end pivotally connected to one of said rigid body members, whereby when said drawbar is moved said stripper rods will rotatably move in one direction and said raking tines in an opposite direction.

2. A dump rake attachment for mounting on a power operated vertically movable drawbar of a tractor having rigid body members such as a transmission housing, wheel guards and the like to rake material in orchards and dump it in windrows comprising, a first elongated member transversely positioned relative to the tractor and pivotally attached to said tractor drawbar for movement in a vertical plane, a first lever fixedly attached to said first elongated member, a second lever coupling said first lever of said first elongated member to one of said rigid body members of said tractor for swinging said first elongated member about its pivot in an arc of movement when said tractor lift is moved, a second elongated member operatively coupled with said first elongated member for relative longitudinal sliding movement to position one end of said second elongated member a selected distance outward from the end of said first elongated member, locking means coupled between said first elongated member and said second elongated member for holding said second elongated member in said outward position, a plurality of spaced raking tines attached longitudinally of said second elongated member, a shaft rotatably journaled on said second elongated member longitudinally thereof, a plurality of stripper rods fixedly attached on said shaft to cooperate with said raking tines during dumping, a plurality of socket members fixed to said shaft, a third lever having one end selectively attachable in one of said sockets, and a fourth lever pivotally coupling the other end of said third lever with one of said rigid body members, so that movement of said drawbar will swing said stripper bars and said rake head in opposite directions.

3. In a dump rake attachment as claimed in claim 2, a swivel wheel mounted on the end of said first elongated member from which said second elongated member is outwardly slidable.

4. A dump rake attachment for installation on a power operated vertically moving drawbar of a farm tractor having rigid body members such as a transmission housing, wheel guards and the like, comprising, an elongated rake head having coupling means for attachment to the liftable drawbar of the tractor on a horizontal axis, tines attached to said rake head in spaced apart lengthwise relation, a shaft journaled in said rake head parallel thereto, stripper bars carried by said shaft, said stripper bars being spaced intermediate of said tines, a rake head operating lever having one end fixedly attached to said rake head, a stripper bar operating lever having one end fixedly attached to said shaft, a first coupling lever having one end pivotally connected to the other end of said rake head operating lever and its other end pivotally connected to one of said rigid body members, a second coupling lever having one end pivotally connected to the other end of said stripper bar operating lever and its other end pivotally connected to one of said rigid body members, said connection of each of said coupling levers to said rigid body members being in a relation which places one of the coupling levers under compression and the other under tension to move said rake head and said shaft in opposite directions when said drawbar is moved.

References Cited in the file of this patent

UNITED STATES PATENTS

| | | |
|---|---|---|
| 292,013 | Holman | Jan. 15, 1884 |
| 635,751 | Dennis | Oct. 31, 1899 |
| 2,366,234 | Blaydes | Jan. 2, 1945 |
| 2,475,908 | McCleskey | July 12, 1949 |
| 2,526,028 | Johnson | Oct. 17, 1950 |
| 2,535,812 | Phillips | Dec. 26, 1950 |
| 2,541,308 | Tobin | Feb. 13, 1951 |
| 2,573,054 | Pearson | Oct. 30, 1951 |
| 2,593,780 | McIntosh | Apr. 22, 1952 |
| 2,603,934 | Sinnett | July 22, 1952 |
| 2,634,572 | Collins | Apr. 14, 1953 |